Nov. 1, 1966 J. D. WALLS 3,282,495
SEALING ARRANGEMENT FOR SCREW-TYPE COMPRESSORS
AND SIMILAR DEVICES
Filed April 29, 1964 2 Sheets-Sheet 1
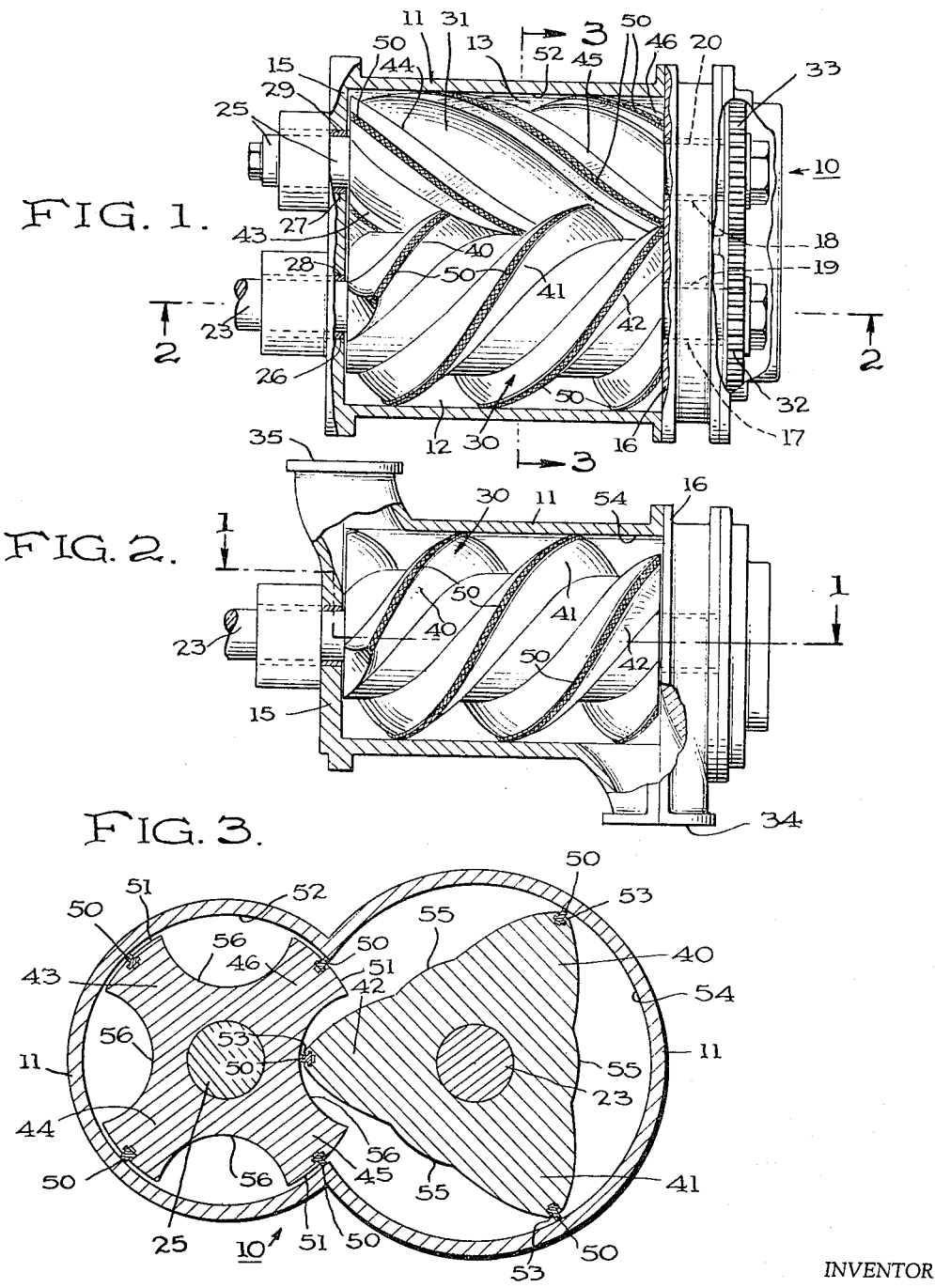
INVENTOR
JOSEPH D. WALLS
BY Cameron, Kerkam & Sutton
ATTORNEYS Nov. 1, 1966   J. D. WALLS   3,282,495
SEALING ARRANGEMENT FOR SCREW-TYPE COMPRESSORS
AND SIMILAR DEVICES
Filed April 29, 1964   2 Sheets-Sheet 2

INVENTOR
JOSEPH D. WALLS
BY
Cameron, Kerkam & Sutton
ATTORNEYS

United States Patent Office 3,282,495
Patented Nov. 1, 1966

3,282,495
SEALING ARRANGEMENT FOR SCREW-TYPE COMPRESSORS AND SIMILAR DEVICES
Joseph D. Walls, Connersville, Ind., assignor to Dresser Industries, Inc., Dallas, Tex., a corporation of Delaware
Filed Apr. 29, 1964, Ser. No. 363,387
4 Claims. (Cl. 230—143)

This invention relates generally to fluid pumps, motors and compressors, and more particularly to a sealing arrangement for a screw-type compressor having interengaging rotary members provided with helical intermeshing threads.

Screw-type fluid compressors, motors, blowers and the like generally are provided with two or more helically threaded members rotatably supported with their axes parallel. These members are customarily referred to as a main or male rotor and a gate or female rotor, and have complementary threads intermeshing to provide a continuous seal line along the full length of the rotors. A housing encloses both of the rotary members and the perimetric tip of each thread forms an effective seal therewith. Thus any flow of fluid from one end of the members to the other must pass through the spaces enclosed by the threads on the rotary members in cooperation with the housing.

When rotated, the main rotor threads, in effect, act as a continuous series of pistons which slide endwise through the troughs between the threads of the gate rotor and produce a continuous series of pockets which convey fluid from a suction port at the intake end of the housing to a discharge port at the outlet end of the housing. Screw-type devices of this general construction are usually reversible so as to operate as either pumps or motors, and such reversing reverses the functions of the ports.

This general type of device is well known in the art and is used for various purposes. However, heretofore all such devices have had certain serious limitations. For example, in screw-type fluid pumps, motors, compressors and the like, the sealing lines between the threads and troughs of the main and gate rotors and the seals between the rotor threads and compressor housing have always constituted a serious problem in operating the compressor at maximum efficiency. In order to obtain the best efficiency for the compressor, it is necessary that the rotor profiles be constructed to give continuous or uninterrupted sealing lines between the rotors as they revolve. It is also necessary that the rotors and associated shafts be of rigid design, that the rotors be of such shape that they can be made accurately and economically, and that no leakage openings develops as the rotors revolve. To maintain maximum efficiency, rotor-to-rotor and rotor-to-housing clearances must be held to a minimum while operating at high relative velocities.

When such rotors are utilized in high temperature applications, the sealing problem becomes further complicated due to large thermal differential expansion of the different parts. Frequently, parts expand to such an extent that rubbing occurs between the threads and the grooves of the cooperating rotors, or between the threads of the rotors and the housing. Such rubbing, if allowed to occur, could result in permanent damage to the pump or compressor.

When accurately formed, complementary threads of the rotor members will operate as smoothly as a set of gears, and the main rotor can be used to drive the gate rotor. However, since the rotor usually operate without lubrication on the thread surfaces, and because of the relatively high speeds at which these devices operate, it is generally advisable to provide timing gears for the rotors so that they may operate in timed relation with certain fixed clearances sufficient to avoid contact with each other and with the housing. While the clearance between the rotors and the housing may be predetermined to prevent contact or rubbing and the consequent damage which may result, the clearance results in leakage of the fluid being handled and adversely affects the efficiency of the device.

Several attempts have been made at solving the aforementioned problems. One such attempt proposes the use of resilient, plastic or metallic coatings of various types applied to the rotating parts which are run initially at negative clearance in order to establish a tight seal between the parts. However, each of the coatings heretofore used has exhibited serious disadvantages. Plastic coatings tend to fatigue under the repeated stresses to which they are subjected, and do not exhibit satisfactory sealing characteristics at the high temperatures accompanying the high compression ratios of modern equipment. The resilient coatings, such as rubber and rubber-like materials, likewise are not suited for high temperature application, and also tend to abrade. Metallic coatings, in general, have been unsatisfactory due to the tendency of small particles to tear loose from the coatings and to catch on the moving parts, or to become suspended in the fluid being processed.

An alternate approach which has been suggested utilizes a thin metal fin extending longitudinally of and projecting radially from the tip of the thread. This arrangement has proved undesirable due to interference between the strips on the male and female members. The metal fins are not easily deformable and are consequently subject to binding and breakage, and permanent damage to the rotors may easily result.

The present invention avoids hte above-mentioned difficulties by incorporating a replaceable, elongated wearable sealing strip in the perimetric tip or outer land portion of each thread of the rotors. The seal strip is sufficiently sturdy and rigid to withstand normal forces encountered due to pressure differentials, centrifugal force, dirt impingement and handling, and is flexible enough to conform to the contour of the surface to which the strip is mounted. The seal strip preferably comprises a honeycomb cell structure secured to a suitable base or backing, the complete strip being inserted in a preformed slot in the tip of the thread.

The sealing strip of the present invention is readily deformable and will wear away when it comes into frictional contact with or rubs against another surface, such as the housing, without damage to either the housing or the rotor. In addition, the honeycomb structure of the strip presents a minimum area at the rubbing or contact surface which prevents excessive heat build up causing thermal instability, while at the same time a sufficient area is provided to effectively throttle any leakage across the rubbing or contact surface. A seal strip of these characteristics permits closer clearances to be maintained between the rotors and the housing, and hence provides greater efficiency in the operation of the unit which it is used. It further permits the rotors to be made accurately and economically with practical tolerances, and prevents catastrophic damage in the event of rubbing between the rotors or between a rotor and the housing.

Accordingly, the principal object of this invention is to provide improved means for sealing the clearances between the rotary and stationary parts of screw-type compressors and similar devices.

Another object is to provide a novel form of replaceable sealing strip for the rotors of such devices which will wear away when the strip contacts or rubs against the housing.

A further object of the invention is to provide an improved sealing element for screw-type compressors and the like which, while simple in construction and economical to manufacture, effectively minimizes leakage and improves the efficiency of operation of the device in which it is incorporated.

These and other objects and advantages will appear more fully upon consideration of the detailed description of various embodiments of the invention which follows. In this connection, since the invention is especially well adapted for use in screw-type rotary compressors, the following disclosure will be directed primarily to this particular application of the inventive concept. By so doing, however, it is not intended to limit the scope of the invention to such compressors, because it will be obvious that it has equal utility in various other fluid handling devices having one or more rotors which operate in a stationary casing, including pumps, blowers, motors and the like.

In one embodiment of the present invention, a screw-type compressor is provided with a housing in which two or more helically threaded members are rotatably supported with their axes parallel and with their complementary threads intermeshing. The rotors and housing are accurately formed with certain fixed clearances therebetween so that the perimetric surfaces of the rotor threads run in close proximity to both the rotor troughs and the housing. The tip or outer land portion of each thread is provided with a preformed longitudinally extending slot within which is removably secured a wearable seal strip which provides the desired sealing between the rotating members and the stationary housing. In this application of the invention, the preformed slot is substantially T-shaped in cross-section, while the sealing strip, comprising a honeycomb cell structure mounted on a backing element, is complementary in cross-section to the slot so as to be slidably inserted therein during assembly. The honeycomb cell structure of the seal strip presents an outer surface which will readily wear away without damage to the compressor in the event of rubbing contact between the relatively movable parts, and without excessive heat build up which might result in thermal instability. In addition, the honeycomb cell structure provides sufficient area at the rubbing or contact surface to effectively throttle leakage across that surface.

While this specification concludes with claims particularly pointing out and distinctly claiming the novel subject matter herein disclosed, the invention will be more fully understood from the following description taken in conjunction with the accompanying drawings in which:

FIGURE 1 is a plan view, partially in section, of a screw-type compressor embodying the invention, the section being taken on line 1—1 in FIGURE 2;

FIGURE 2 is an elevational view of the compressor shown in FIGURE 1, partially in section on line 2—2 in FIGURE 1;

FIGURE 3 is a transverse sectional view taken on line 3—3 in FIGURE 1;

Figure 4:
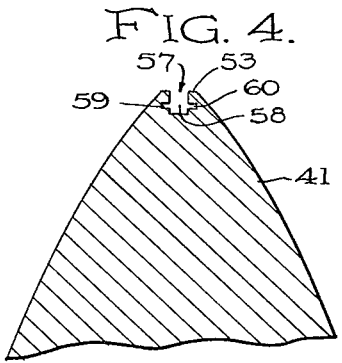
FIGURES 4 and 5 are fragmentary transverse sectional views of a main rotor thread and a gate rotor thread, respectively, of the compressor of FIGURES 1–3, with the sealing strips removed.

Referring now to FIGURES 1–3, there is illustrated therein a screw compressor 10 embodying one form of the novel sealing means provided by the present invention. The housing 11 of the compressor contains two parallel cylindrical rotor chambers 12 and 13 disposed side by side in parallel relationship and merging into one another to form a common chamber of generally figure-eight cross section, as shown in FIGURE 3. One end of the housing 11 is provided with an integral end wall 15 which closes the discharge ends of chambers 12 and 13, while the other end of the housing receives a removable end wall 16 which is suitable centered in the rotor chambers.

The removable end wall 16 is provided with circular openings 17 and 18 having suitable bearing bushings 19 and 20 for the main rotor shaft 23 and the gate rotor shaft 25, respectively. The integral end wall 15 is also provided with openings 26 and 27 in which are mounted bearing bushings 28 and 29, respectively. The main rotor 30 and gate rotor 31 are fixed to the shafts 23 and 25, respectively, and revolve in their respective chambers 12 and 13, being maintained in properly timed relationship by timing gears 32 and 33 which are attached to the main rotor shaft 23 and gate rotor shaft 25, respectively.

A suction port 34 is provided in the end wall 16 and a discharge port 35 is provided in end wall 15, diagonally opposite suction port 34. The open end of the housing 11 is so formed as to provide a support for and properly center the end wall 16 with respect to rotor chambers 12 and 13. The shaft openings 26 and 27 in the integral end wall 15 are also centrally located in relation to the chambers 12 and 13, respectively. This assures a proper positioning of the rotors so that they may be operated within their chambers with small clearances without danger of contacting or rubbing against the housing 11.

The rotors 30 and 31 comprise mating, helically screw-threaded members arranged to operate within the intersecting cylindrical chambers 12 and 13, respectively. For convenience, the rotor member 30 is termed the main rotor, and the rotor member 31 is termed the gate rotor. Power may be applied to the rotors in any suitable manner to move fluid from the suction port 34 to the discharge port 35 against pressure and thereby compress it, or fluid may be supplied to the device under pressure, in which case it will act as a motor to supply power.

As shown, the main rotor 30 is provided with three circumferentially evenly spaced helical threads 40, 41 and 42 of identical contour, and preferably operates within its chamber 12 without making contact with the housing 11, the end walls 15 and 16, or the gate rotor 31. Alternatively, the main rotor may be provided with only two threads, or with more than three threads, the larger number of threads generally being chosen for high speed operation and high internal compression ratios.

The gate rotor 31 is provided with four circumferentially evenly spaced helical threads 43, 44, 45 and 46 so formed as to be complementary to the main rotor threads. The gate rotor 31 also preferably operates without contacting the housing 11 or the main rotor 30, and may have more or less than four threads, if desired. However, the use of three main rotor threads and four gate rotor threads provides the optimum combination. After the rotors are assembled within the housing, the timing gears 32 and 33 are properly located on their respective shafts 23 and 25 so that, as the rotors revolve, the timing gears will prevent the rotor threads from contacting each other.

What has been described thus far is a known form of screw-type fluid pump or compressor similar in construction and operation to those disclosed in such patents as Whitfield No. 2,922,377. In accordance with this invention, each of the rotors 30 and 31 is provided with a replaceable sealing strip 50 which is mounted in and projects outwardly from the perimetric tip or land of each of the threads. The desirability of employing outwardly projecting sealing elements capable of wearing off without damage should they rub against another surface can be readily appreciated. Such wearable strips permit a compressor of the kind described to be constructed with sufficient clearances between the relatively moving parts to compensate for unequal expansion of the parts under the influence of heat of compression, or for lateral and torsional deflection of the rotors, and also permit more leeway in tolerances in the manufacture of the rotors. Without such wearable strips, the point requiring maximum clearance determines the clearances throughout the compressor, a condition which results in excessive leakage and inefficient operation, and also makes the compressor susceptible to damage in the event of rotor rub. The strips 50, which will be deformed due to any rubbing which may occur, wear only in the areas in which clearance becomes necessary.

As shown in FIGURE 3, the rotor profiles of the compressor 10 are designed to have small clearances between perimetric tip or land surfaces 51 of the gate rotor threads and the wall 52 of the chamber 13 of housing 11, between the perimetric surfaces 53 of the main rotor threads and the wall 54 of the chamber 12 of housing 11, and between the perimetric surfaces of the gate and main rotor threads and the cooperating sealing surfaces of their grooves or troughs 55 and 56, respectively. In order to properly seal these clearances, each thread is provided with a wearable sealing strip 50 which is removably mounted in a preformed slot 57 formed in the tip portion of the thread.

Figure 5:
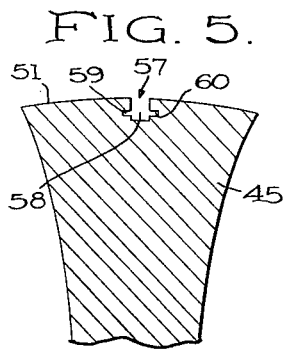

Referring now to FIGURES 4 and 5, which are enlarged fragmentary cross-sectional views of the outer ends of the main rotor thread 41 and the gate rotor thread 45, each thread is provided with a preformed slot 57 extending longitudinally along the central portion of its perimetric tip or land which is adapted to receive and hold a sealing strip 50. In the form shown, the slot 57 is generally cross-shaped in cross section, having a main or central opening 58 extending radially inward from the tip or land surface 51 or 53, corresponding to the trunk of the cross, and a pair of lateral openings 59 and 60 extending transversely to the central opening 58, corresponding to the arms of the cross. As indicated in FIGURE 3, the sealing strip 50 is substantially T-shaped in cross section, and is adapted to be mounted in the slot 57 in inverted position with the upright portion of the T in central opening 58 of the slot and the ends of the crossbar in lateral openings 59 and 60. The portion of the slot which lies below the lateral openings 59 and 60 provides tool clearance when machining the lateral openings and bottom clearance when inserting the strip thus reducing friction in assembly.

While in the embodiment illustrated the slot 57 is substantially cross-shaped in cross section, it should be readily apparent that various other forms of slot may be utilized. For example, the slot may be T-shaped in cross section, corresponding to the shape of the sealing strip, or may be simply channel-shaped, in which event the sealing strip may be secured by in the slot welding, brazing, adhesive, or in any other suitable manner. However, the cross-shaped or T-shaped slot is preferred because it facilitates assembly in that the sealing strip may be pushed or pulled into the slot from one end of the rotor, and because no additional means are necessary to hold or secure the strip in the slot against centrifugal forces. In order to further facilitate assembly, the sealing strip may be formed with a short section of uncovered backing strip at one end which functions as a leading tongue and is gripped by a suitable pulling tool when the strip is pulled into the slot. When the strip is in place, the tongue is cut off and both ends of the sealing strip are brazed or welded to the end surfaces of the rotor. Should it be desired to replace the sealing strip, it is only necessary to destroy the brazed or welded joints at the ends, push or pull the strip out of the slot, and replace it with a new one.

Figure 6:
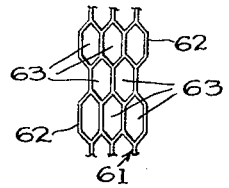
FIGURE 6 is an enlarged fragmentary plan view of the honeycomb seal structure of the seal strips shown in FIGURES 7–14.
Figure 7:
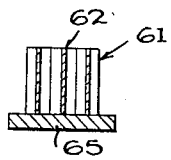
FIGURES 7–14 are transverse sectional views of various forms of wearable sealing strips embodying the honeycomb seal structure of FIGURE 6 and usable in the compressor of FIGURES 1–3.

FIGURE 6 shows a honeyomb sealing structure 61 of a form particularly adapted for embodiment in the sealing strip 50 of the present invention. As shown, the honeycomb structure comprises a plurality of relatively thin or light gauge corrugated metal partition strips 62 which are secured together in known manner to form a narrow elongated strip 61 of hexagonal cells 63 the edges of which lie in parallel planes perpendicular to the partition strips 62. Although the strip 61 may vary in cell width, it has been found that a structure having a three-cell width as illustrated is minimum for effective sealing, and that wider sections may be desirable in some applications. The cellular or honeycomb structure 61 is preferably made of a high nickel-chromium iron alloy, such as Inconel, although aluminum, bronze, stainless steel and other metals commonly used in the manufacture of honeycomb members may also be used. It is only necessary that the cell structure be resistant to high temperatures and corrosion, sufficiently sturdy and rigid to withstand the forces normally encountered in rotary compressor operation due to such factors as pressure differentials rubbing and centrifugal force, and flexible enough to be formed or worn to the contour of the surfaces with which they cooperate.

Figure 8:
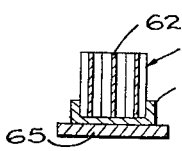

Referring now to FIGURES 7–14, there are shown therein various forms of sealing strips embodying the honeycomb structure 61 of FIGURE 6 and adapted for mounting in the slots 57 of FIGURES 4 and 5. In FIGURE 6, the honyecomb material 61 is assembled on a backing strip 65 of Inconel or other suitable metal, and is secured thereto by brazing, welding or the like. The backing strip 65 serves to provide a rigid support for the honeycomb material 61 and completes the inverted T-shaped cross section of the sealing strip 50 which corresponds to the shape of slots 57 in the rotor threads. If additional support is desired for the honeycomb structure, the later may be secured to a channel-shaped member 66, as shown in FIGURE 8, which is in turn brazed or welded to the backing strip 65. This provides a more substantial crossbar of the T, and also serves to increase the heat dissipating ability of the structure since the supporting member 66 and backing strip 65 act as a heat sink.

Figure 9:
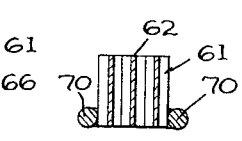
Figure 10:
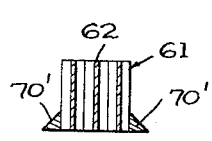
Figure 11:
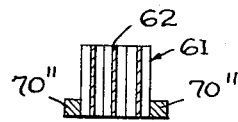

In FIGURES 9, 10 and 11, the backing strip 65 is omitted and in lieu thereof a pair of longitudinally extending wires are provided which are welded or brazed to the lower portions of the sides of the honeycomb strip to form the T-shaped section. As shown, the wires 70, 70' and 70'' of FIGURES 9, 10 and 11 have cross sections which are round, triangular and square, respectively, but it will be obvious that other shapes may be employed, if desired. This type of construction, while maintaining the necessary characteristics of the sealing strips, provides greater economy in manufacture both of the strips themselves, and of the corresponding slot structure in the rotor threads.

Figure 12:
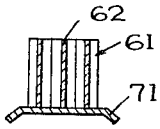
Figure 13:
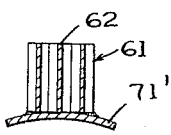

FIGURES 12 and 13 show sealing strips in which the honeycomb structure 61 is secured to prestressed backing strips 71 and 71', respectively, having downwardly turned outer ends which, when inserted in the lateral portions 59 and 60 of slot 57, give the crossbar of the T a spring action which more positively secures the strip in the slot.

Figure 14:
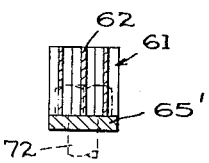

FIGURE 14 illustrates a modified form of sealing strip adapted for mounting in a rectangular slot in the rotor thread, and wherein the backing strip 65' is of the same width as the honyecomb structure 61. This type of strip may be secured in the rotor slot by screws 72, as indicated in broken lines in FIGURE 14, or by welding, brazing or the use of a suitable adhesive.

Figures 15, 16:
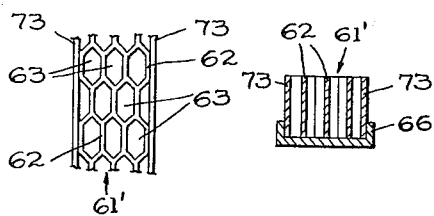
FIGURE 15 is an enlarged fragmentary plan view of a modified form of honeycomb seal structure.
FIGURE 16 is a transverse sectional view of a sealing strip embodying the honeycomb seal structure of FIGURE 15.

The honeycomb seal structure 61' shown in FIGURE 15 is similar to that of FIGURE 6 except that a straight strip 73 of metal of the same height and the same gauge or thickness as corrugated partition strips 62 has been added along each side of the honeycomb strip, being brazed or welded to the outermost longitudinally extending walls of the cells 63 so as to strengthen and stabilize the structure. Due to the greater stability of the honeycomb structure of FIGURE 15, it requires only a channel-shaped backing strip 66, as shown in FIGURE 16, to form a sealing strip which can be mounted in a cross-shaped or T-shaped slot in the tip of a rotor thread, similarly to the strips previously described. In this instance, the turned-up edges of the backing strip 66 serve as the laterally extending arms of a T which thus has a relatively thick upright portion and a crossbar which extends only a relatively short distance beyond the edges of the upright portion. This form of sealing strip has been found particularly well adapted for use in compressors of the type shown in Rathman Patent No. 2,511,878.

Figure 17:
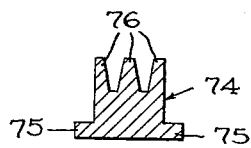
FIGURE 17 is a transverse sectional view of an extruded metal sealing strip likewise adapted for use in devices of the type illustrated in FIGURES 1–3.

FIGURE 17 shows an alternative embodiment of the sealing strip utilizing extruded metal, such as aluminum, for both the backing strip and the wearing surfaces. The strip illustrated is of substantially inverted T-shaped, as in the other embodiments, and comprises a main trunk or body portion 74 formed integrally with a crossbar portion having laterally extending arms 75. The main body portion 74 is so shaped as to provide a plurality of upwardly or outwardly extending fingers or fins 76 which form the contact or rubbing surfaces of the sealing strip.

Although several embodiments of the inventive concept have been described and illustrated herein, various modifications thereof may be made without departing from the spirit of the invention. It is therefore intended by the appended claims to cover all such modifications which fall within the true scope of the invention.

What is claimed is:

1. In a fluid handling device of the type having a housing provided with intersecting cylindrical bores and suction and discharge ports adjacent the opposite ends of said housing, a pair of mating helically threaded rotors rotatably supported within said cylindrical bores and having threads and troughs cooperating with each other and said housing to form pockets which receive fluid from the suction port, axially advance the fluid from the suction end to the discharge end of the housing and discharge the fluid through said discharge port as the rotors revolve in opposite directions about the axes thereof, the improvement comprising a first longitudinally extending channel in the perimetric surface of each thread of said rotors, a pair of longitudinally extending channels adjacent said first channel, said pair of channels being disposed in opposed relationship and spaced from the perimetric surface of the thread, each channel of said pair of channels opening into said first channel to form therewith a slot substantially T-shape in cross-section, a backing member and a metallic honeycomb sealing element secured thereto and forming therewith a wearable sealing strip substantially T-shape in cross-section, said sealing strip being rigidly mounted in said slot with the backing member being positioned in the pair of longitudinally extending channels and the honeycomb element being positioned in the first longitudinally extending channel and extending beyond the perimetric surface of said thread for sealing engagement with the housing and with the troughs of the mating rotor within which said threads are received as the rotors revolve.

2. A fluid handling device as set forth in claim 1 wherein said backing member is prestressed and extends laterally beyond the sides of said honeycomb element, said prestressed backing member being downwardly turned at opposite ends so as to impart a spring action to said sealing strip when said ends are mounted in the pair of longitudinally extending channels to resist displacement of said sealing strip relative to said slot when said sealing strip is mounted in said slot.

3. A fluid handling device as set forth in claim 2 wherein said backing member is channel-shaped and includes a base member and a pair of side members extending normal thereto, said honeycomb element being secured between said side members, said side members of the backing member being mounted in said pair of longitudinally extending channels.

4. In a fluid handling device of the rotary positive displacement type having a housing provided with an inlet and an outlet, a pair of mating rotors rotatably supported in said housing and adapted to be rotated in cooperative relationship to effect advancement of fluid from the inlet to the outlet, the improvement comprising a first longitudinally extending channel in the perimetric surface of each of said rotors, a pair of longitudinally extending channels adjacent said first channel, said pair of channels being disposed in opposed relationship and spaced from the perimetric surface of the rotors, each channel of said pair of channels opening into the first channel to form a slot substantially T-shape in cross-section, a backing member and a metallic honeycomb sealing element secured thereto to form therewith a wearable sealing strip substantially T-shape in cross-section, said sealing strip being rigidly secured in said slot with the backing member being mounted in the pair of longitudinally extending channels and the honeycomb element extending beyond the perimetric surface of the rotor for sealing engagement with said housing and with the mating rotor.

References Cited by the Examiner

UNITED STATES PATENTS

| | | | |
|---|---|---|---|
| 1,497,239 | 6/1924 | Johnson | 123—8 |
| 1,698,802 | 1/1929 | Montelius | 103—128 |
| 2,266,820 | 12/1941 | Smith | 230—143 |
| 2,622,787 | 12/1952 | Nilsson | 230—143 |
| 3,068,016 | 12/1962 | Dega | 230—133 |
| 3,083,975 | 4/1963 | Kelly | 253—77.3 |

FOREIGN PATENTS

| | | |
|---|---|---|
| 134,073 | 10/1919 | Great Britain. |
| 793,886 | 4/1958 | Great Britain. |

MARK NEWMAN, *Primary Examiner.*

WILBUR J. GOODLIN, *Examiner.*